United States Patent
de Putter

[11] 3,796,447
[45] Mar. 12, 1974

[54] PIPE CONNECTING PIECE AND PIPE CONNECTION OBTAINED BY MEANS THEREOF

[75] Inventor: Warner Jan de Putter, Hardenberg, Netherlands

[73] Assignee: Industriele Onderneming Wavin N.V., Zwolle, Netherlands

[22] Filed: Oct. 21, 1971

[21] Appl. No.: 191,400

[52] U.S. Cl................ 285/235, 285/345, 285/379, 285/DIG. 4
[51] Int. Cl............................................. F16l 21/04
[58] Field of Search .......... 285/223, 226, 229, 235, 285/345, 369, 379, 383, DIG. 4

[56] References Cited
UNITED STATES PATENTS

| | | | |
|---|---|---|---|
| 3,592,491 | 7/1971 | Glover | 285/235 X |
| 3,695,643 | 10/1972 | Schmunk | 285/235 X |
| 1,829,236 | 10/1931 | Perkins | 285/229 |
| 3,596,939 | 8/1971 | Gibson | 285/369 |
| 3,368,830 | 2/1968 | French | 285/235 X |
| 2,049,801 | 8/1936 | Gage | 285/383 |
| 3,516,693 | 6/1930 | Glover | 285/235 |
| 1,819,007 | 8/1931 | Smith | 285/383 X |
| 3,632,141 | 1/1972 | Larsson | 285/383 X |

Primary Examiner—Mervin Stein
Assistant Examiner—David H. Corbin
Attorney, Agent, or Firm—Whittemore, Hulbert & Beklnap

[57] ABSTRACT

A pipe connection comprising a corrugated pipe connection piece of thermoplastic material, and two male pipe parts, the pipe connection piece being provided with four crests and a narrowing smaller than the inner diameter of the connection piece being situated symmetrically with respect to the crests. A rubber sealing ring is maintained in a crest by means of a maintaining ring cooperating clampingly with a wave valley of the connection piece.

1 Claim, 4 Drawing Figures

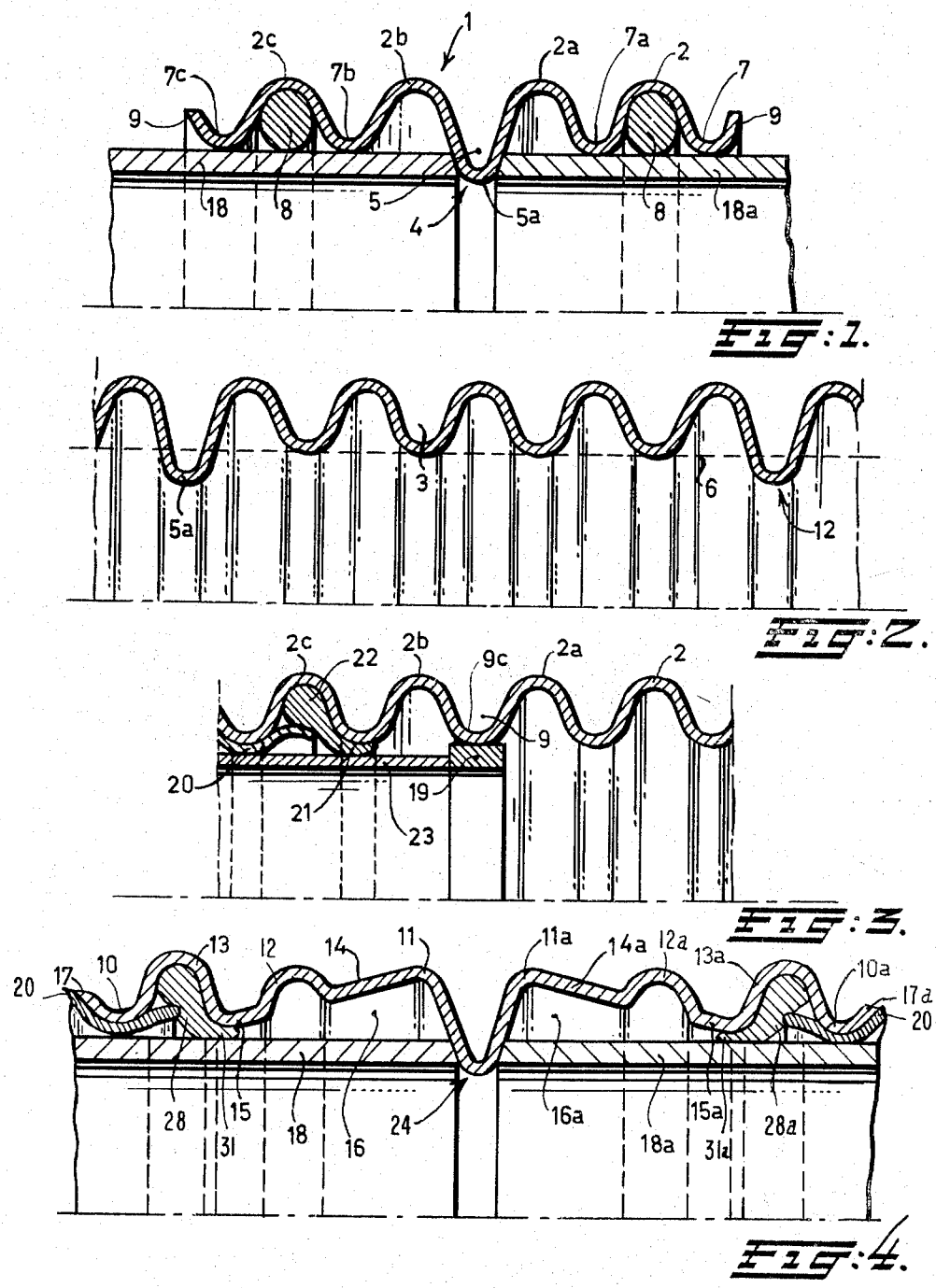

PIPE CONNECTING PIECE AND PIPE CONNECTION OBTAINED BY MEANS THEREOF

BACKGROUND OF THE INVENTION

The invention relates to a pipe connecting piece of thermoplastic synthetic material with tranverse waves which is resistant to deformations up to heating temperatures of at least 20° C below the lowest possible extrusion temperature of the thermoplastic synthetic material.

Pipe pieces of thermoplastic material with transverse corrugations are commonly known, such pipe pieces are obtained by subjecting extruded thermoplastic pipes, directly after their extrusion, to a deformation, whilst enclosing them by dies provided with transverse grooves and whilst applying an inner overpressure in the thermoplastic pipe with respect to the ambient pressure. Due to their deformation directly after the extrusion these pipe pieces are resistant to deformation up to heating temperature of at least 20° C below the lowest possible extrusion temperature of the thermoplastic synthetic material.

Such pipe pieces are applied when electric leads should be laid in buildings or houses, while in the last few years such pipe pieces of thermoplastic material with transverse corrugations are much used in the field of draining and/or irrigation.

Due to the provision of openings in the thermoplastic pipes particularly in the grooves situated between the transverse corrugations such pipe pieces can namely be used for transferring drained off water or for feeding irrigation water to dry ground, while then through these pipe tubes water is fed which issues through the aforementioned openings.

It has been found that such pipes pieces of thermoplastic material with transverse corrugations is particularly suitable to be used as pipe connecting pieces instead of the so far applied connecting pieces in the shape of plastic sockets. Such an application is very advantageous, since to so far applied pipe connecting pieces in the shape of plastic sockets should be manufactured by injection moulding, which due to the considerable thickness of wall gives rise to rather high costs of production, while pipe pieces of thermoplastic material with transverse corrugations can be produced in a very simple way and less material is required for the same strength from which results a considerable economy on material.

SUMMARY OF THE INVENTION

It is now an object of the invention to provide a pipe connecting piece of thermoplastic material with transverse corrugations which is resistant to heating temperatures of at least 20° C below the lowest possible extrusion temperature of the thermoplastic material and wherein the pipe piece, comprises at least two transverse crests at both sides of a narrowing, situated between the transverse crests serving to accommodate sealing means, the inner diameter of these narrowing being smaller than the inner diameter of the rest of the pipe piece. The narrowing is preferably symmetrically situated in between four transverse crests.

Since in such pipe pieces the transverse crests may serve to accommodate the sealing means and on the other hand it is possible to provide in a rather simple way—in manufacturing such pipe pieces — the dies used therefor with inwards directed projections it is possible to manufacture in an inexpensive way pipe pieces with transverse crests and the desired narrowing which are well adapted to be applied to a pipe connection.

The pipe connecting pieces according to the invention are preferably manufactured from polyvinylchloride or polyethylene. It is, however, also possible to use polypropylene for such pipe connections. The narrowing is efficiently formed by a wave valley between two transverse crests the lower points of which are within the cylinder constituted by the inner wall of the other wave valleys.

By using such pipe part it is possible to obtain a pipe connection comprising at least a male pipe part and a pipe connecting piece for receiving a male pipe part. This pipe connecting piece is provided with a narrowing between two crests situated on either side of the narrowing, while sealing means are accommodated in these grooves.

Another important advantage of a pipe connection according to the invention consists in that due to application of a pipe piece according to the invention less material than so far is required for the pipe connecting piece, since due to the application of transverse crests the rigidity pipe piece is improved in such a way that it is resistant to a higher load than pipe connecting pieces without transverse crests.

According to a preferred embodiment of a pipe connection the inner diameter from the transverse crest situated at the free end is always greater than the smallest inner diameter in the vicinity of the free end which mostly corresponds with the inner diameter of the pipe at the location of the end of the pipe or the wave valley which is at the end of the pipe piece.

Preferably the connecting parts between the transverse crests are situated on a conical surface the generatrix of which extends between the top of the transverse crests, situated beside the narrowing, and the point at which the inner diameter in the proximity of the free end is smallest.

Such a pipe connecting piece enables the male pipe part to move pivotally and to absorb movements produced in the ground owing to the slipping of a mass of land without causing damage to the pipe connecting piece according to the invention.

SUMMARY OF THE DRAWINGS:

The invention will now be clarified with reference to the drawing in which an embodiment is represented.

In the drawing:

FIG. 1 is a section of a pipe connection with pipe piece according to the invention, and FIG. 2 is a pipe from which pipe connecting pieces with transverse waves for application to a pipe connection are manufactured;

FIG. 3 is another embodiment of a pipe connecting piece according to the invention, and FIG. 4 is a special variant of such a pipe connecting piece according to the invention, with male pipe part.

DESCRIPTION OF PREFERRED EMBODIMENTS

In FIG. 1 is represented a pipe piece 1 made of polyvinylchloride with transverse crests 2, 2a, 2b and 2c. Instead of four transverse crests 2–2c only two transverse waves to wit the transverse waves 2a and 2b suffice. This pipe piece is resistant to deformation or heating temperatures of at least 160° C that is to say at least 20° C under the lowest possible extrusion temperature of this thermoplastic material. This resistance to deformation results from the fact that these pipe pieces are obtained by extruding a pipe of thermoplastic material in the shape of polyvinylchloride and guiding same immediately between a mould, moving along with the pipe, and generating in the pipe an inner over pressure with respect to the ambient pressure, whereby the plastic pipe is pressed against the grooves in the mould. In this way a pipe of the pipe as represented in FIG. 2 is obtained. By sawing through such a pipe at the point 4 a pipe connecting piece like represented in FIG. 1 is obtained.

Between the transverse crests 2b and 2a is a wave valley 5 the lower point 5a of which is situated within the cylinder 6 constituted by the lower points of the other wave valleys 7a, 7b, 7c, 7d in pipe piece 1.

Due to the selection of the lower point of the wave valley 5 a narrowing, which can also be denoted by 4, is also obtained within the pipe piece 1.

The narrowing 4 is symmetrically situated between the transverse crests 2, 2a, 2b and 2c serving to receive sealing means 8 in the shape of rubber rings or rubber sealings. In the embodiments shown the sealing means 8 are accommodated in the recesses constituted by the transverse crests 2, 2c, but it will be obvious that the aforementioned means could also be accommodated in the recesses constituted by the transverse crests 2a, 2b. This is, however, less advisable, since hereby the sealing means come close to lie at the end 9 of the male pipe part 18 and 18a. This pipe part is smooth.

If desired sealing means may be accommodated in the recesses formed by the transverse grooves 2, 2a, 2b, as well as 2c. The narrowing 4 which in FIG. 1 is represented as a deepened wave valley can also be formed by exerting a compressive force at the ends of pipe piece and as shown in FIG. 3 to slide into the pipe piece an annular ring member 19 with an outer diameter such that on cancelling the compressive force to which this pipe piece is subjected the ring 19 clampingly contacts the lowest point 9c of the wave valley 9 which is then as deep as the wave valley situated between the transverse crests 2b and 2c and between 2a and 2. It will, however, be obvious that an additional treatment is required therefor. In this way it is, however, also possible, starting from the commercially available pieces of plastic pipe with transverse crests, to manufacture directly a pipe piece according to the invention which is suitable for the pipe connection.

In FIG. 4 is represented a pipe connecting piece comprising three transverse crests on either side of a narrowing 24 constituted by a wave valley. The transverse waves are denoted by the references 11, 12, 13 and 11a, 12a, 13a, respectively. The sealing means 28, 28a are accommodated in the transverse crests 13, 13a, respectively, the sealing means consisting e.g., of a rubber ring maintained by a ring 20 inserted between wave valley 10 and pipe part 18.

In the vicinity of the free end 17, 19a of the pipe connecting piece is a wave valley 10, 10a, respectively, while at that location the inner diameter is larger than the smaller inner diameter at the location of the narrowing 24, but on the other hand this inner diameter is smaller than the inner diameter of the other part of the pipe connecting piece situated between the narrowing 24 and the end 17. The transverse waves 11, 12, 13 and 11a, 12a, 13a respectively are connected by connecting pieces 14, 15 and 14a, 15a, respectively which are situated on a conical surface the generatrix of which corresponds with the line drawn through the connecting parts 14 and 15. In this way a space 16, 16a, respectively is obtained in which the male part situated in the pipe connecting piece can pivot about 17, 17a.

In order to avoid removal of ring 8 accommodated in the crest 2c during insertion of pipe part 18, it is recommended to maintain said ring as shown in FIGS. 3 and 4 by means of a maintining ring 20 which cooperates clampingly with the bottom of a wave valley. The sealing means, may now consist of a ring body 22 having a lip 21 cooperating with pipe part 23 as shown in FIG. 3 or sealing rings 28,28a with lips 31,31a as shown in FIG. 4.

The maintaining ring 20 consists of a relatively thin walled plastic material which can be inserted by deformation. It is even possible to improve the flexibility of the maintaining ring by providing the ring 20 with longitudinal notches ending before the end of the ring cooperating with the sealing means and starting from the opposite end.

What I claim is:

1. A pipe connection adapted to surround the spaced adjacent ends of two cylindrical pipes, said pipe connection being a thin-walled corrugated sleeve having a central inwardly directed wave valley of smaller diameter than said pipes extending into the space between said adjacent pipe ends, said corrugated sleeve having at its opposite ends inwardly directed wave valleys substantially engaging the respective pipes, and having intermediate portions between said central and end wave valleys which are of larger diameter than said pipes providing a substantial clearance space into which the pipe ends can be laterally displaced by pivoting about the points where said inwardly directed end wave valleys substantially engage said pipes, each intermediate portion having three transverse crests extending outwardly from a conical surface, the generatrix of which extends between the transverse crest adjacent said central wave valley and the point at which the inwardly directed end wave valley substantially engages said pipe, the outer of said transverse crests receiving a sealing ring which is maintained therein by means of a thin-walled plastic ring cooperating clampingly with the bottom of said end wave valley, said sealing ring having a lip extending beneath the bottom of a wave valley, said wave valleys and said crests extending circumferentially around said sleeve and said conical surface extending radially outwardly from said crests receiving said sealing ring.

* * * * *